(12) United States Patent
Gu et al.

(10) Patent No.: US 11,762,416 B2
(45) Date of Patent: Sep. 19, 2023

(54) TRANSPARENT LAMINATED FILM, DISPLAY DEVICE AND METHOD FOR MANUFACTURING TRANSPARENT LAMINATED FILM

(71) Applicant: BOE Technology Group Co., Ltd., Beijing (CN)

(72) Inventors: Penghao Gu, Beijing (CN); Jiahao Zhang, Beijing (CN); Pao Ming Tsai, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 623 days.

(21) Appl. No.: 16/640,522

(22) PCT Filed: Jan. 3, 2019

(86) PCT No.: PCT/CN2019/070244
§ 371 (c)(1),
(2) Date: Feb. 20, 2020

(87) PCT Pub. No.: WO2020/140233
PCT Pub. Date: Jul. 9, 2020

(65) Prior Publication Data
US 2021/0141415 A1    May 13, 2021

(51) Int. Cl.
*G06F 1/16*  (2006.01)
*G02B 1/14*  (2015.01)
(Continued)

(52) U.S. Cl.
CPC ............ *G06F 1/1607* (2013.01); *B32B 7/022* (2019.01); *B32B 7/023* (2019.01); *B32B 27/281* (2013.01);
(Continued)

(58) Field of Classification Search
CPC ..... G06F 1/1607; G06F 1/1637; B32B 37/06; B32B 2307/412; B32B 2307/42;
(Continued)

(56) References Cited

U.S. PATENT DOCUMENTS

2009/0022939 A1* 1/2009 Yanagida ............... B32B 27/281
                                                                428/101
2010/0297403 A1* 11/2010 Thorpe ................. B32B 27/308
                                                                428/339
(Continued)

FOREIGN PATENT DOCUMENTS

CN    207541602 U    6/2018
CN    108461519 A    8/2018
(Continued)

OTHER PUBLICATIONS

Machine translation of JP 2007-098905. (Year: 2007).*
Nov. 25, 2021—(CN) First Office Action Appn 201980000033.7 with English translation.
Jul. 18, 2022—(EP) Extended European Search Report Appn 19861236.8.
(Continued)

*Primary Examiner* — John D Freeman
(74) *Attorney, Agent, or Firm* — Banner & Witcoff, Ltd.

(57) ABSTRACT

A transparent laminated film, a display device, and a method for manufacturing a transparent laminated film are disclosed. The transparent laminated film includes a first film layer, a central film layer, and a second film layer which are sequentially stacked, each of a material of the first film layer and a material of the second film layer includes a thermoplastic plastic, and a material of the central film layer includes a thermosetting plastic.

17 Claims, 3 Drawing Sheets

(51) Int. Cl.
*B32B 27/28* (2006.01)
*B32B 7/023* (2019.01)
*B32B 7/022* (2019.01)
*B32B 37/06* (2006.01)

(52) U.S. Cl.
CPC ............... *B32B 37/06* (2013.01); *G02B 1/14* (2015.01); *B32B 2250/03* (2013.01); *B32B 2250/24* (2013.01); *B32B 2250/40* (2013.01); *B32B 2307/412* (2013.01); *B32B 2307/42* (2013.01); *B32B 2307/51* (2013.01); *B32B 2307/54* (2013.01); *B32B 2457/206* (2013.01); *B32B 2457/208* (2013.01)

(58) Field of Classification Search
CPC .......... B32B 2307/51; B32B 2457/208; B32B 37/10; B32B 2457/20; B32B 27/34; B32B 7/027; B32B 2250/24; B32B 2250/40; B32B 2255/20; B32B 2307/536; B32B 2307/54; B32B 2307/584; B32B 2457/206; B32B 7/022; B32B 7/023; B32B 27/281; B32B 3/06; B32B 27/08; B32B 2250/03; B32B 2250/04; B32B 2250/05; B32B 2255/10; G02B 1/14; G02B 5/3033
See application file for complete search history.

(56) References Cited

U.S. PATENT DOCUMENTS

| | | |
|---|---|---|
| 2016/0089831 A1 | 3/2016 | Misono |
| 2019/0211168 A1 | 7/2019 | Thompson et al. |
| 2020/0028117 A1 | 1/2020 | Eckert et al. |

FOREIGN PATENT DOCUMENTS

| | | |
|---|---|---|
| CN | 108877529 A | 11/2018 |
| CN | 208210430 U | 12/2018 |
| JP | H11166162 A | 6/1999 |
| JP | 2007098905 A | 4/2007 |
| JP | 2008188843 A | 8/2008 |
| JP | 2009300506 A | 12/2009 |
| JP | 2018171718 A | 11/2018 |
| WO | 2006011461 A1 | 2/2006 |
| WO | 2007108284 A1 | 9/2007 |
| WO | 2017169651 A1 | 10/2017 |
| WO | 2017214105 A2 | 12/2017 |
| WO | 2018102607 A1 | 6/2018 |
| WO | 2018186262 A1 | 10/2018 |

OTHER PUBLICATIONS

Nov. 1, 2022—(JP)—Office Action Appn 2020-560967 with English Translation.

* cited by examiner

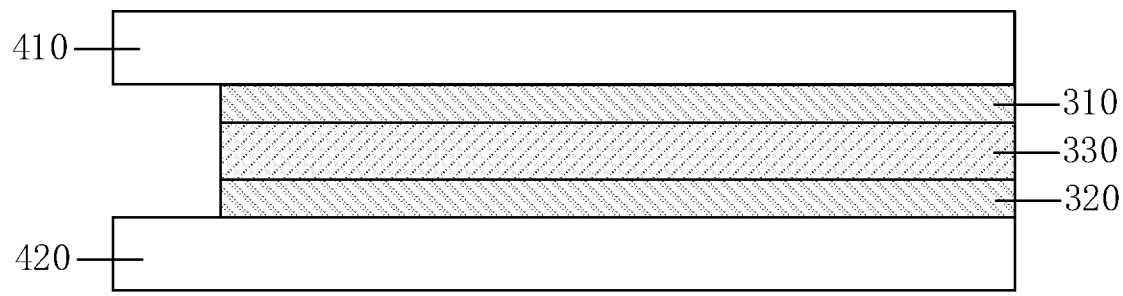
FIG. 5
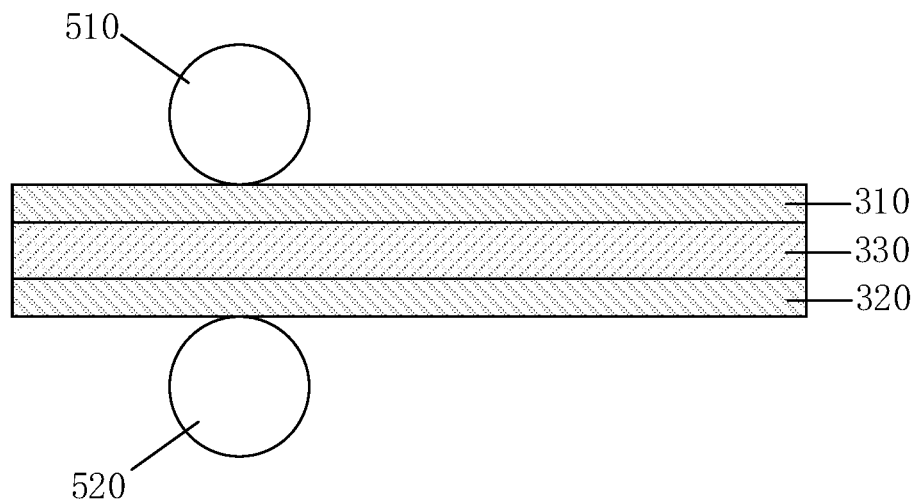
FIG. 6
FIG. 7

TRANSPARENT LAMINATED FILM, DISPLAY DEVICE AND METHOD FOR MANUFACTURING TRANSPARENT LAMINATED FILM

The application is a U.S. National Phase Entry of International Application No. PCT/CN2019/070244 filed on Jan. 3, 2019, designating the United States of America. The present application claims priority to and the benefit of the above-identified application and the above-identified application is incorporated by reference herein in its entirety.

TECHNICAL FIELD

Embodiments of the present disclosure relate to a transparent laminated film, a display device, and a method for manufacturing a transparent laminated film.

BACKGROUND

With development of display technology, the display device has been gradually applied to various fields and becomes one of the most widely used electronic devices. In recent years, with development of folding display, various requirements for film materials of the flexible display device have been put forward. As the uppermost surface of the display module, the attached window film can prevent the surface of the display device from being scraped or scratched, and can further ensure a high transmittance of the material itself while providing protection, so that the normal display of the display device may not be affected.

SUMMARY

At least an embodiment of the present disclosure provides a transparent laminated film used for covering a display side of a display panel, the transparent laminated film includes a first film layer, a central film layer, and a second film layer which are sequentially stacked, each of a material of the first film layer and a material of the second film layer comprises a thermoplastic plastic, and a material of the central film layer comprises a thermosetting plastic.

For example, in the transparent laminated film provided by at least an embodiment of the present disclosure, the thermoplastic plastic comprises thermoplastic polyimide, and the thermosetting plastic comprises thermosetting polyimide.

For example, in the transparent laminated film provided by at least an embodiment of the present disclosure, a transmittance of the central film layer is greater than a transmittance of the first film layer and greater than a transmittance of the second film layer.

For example, in the transparent laminated film provided by at least an embodiment of the present disclosure, an elastic modulus of the central film layer is greater than an elastic modulus of the first film layer and greater than an elastic modulus of the second film layer.

For example, in the transparent laminated film provided by at least an embodiment of the present disclosure, the transmittance of the central film layer is greater than 90%, and the elastic modulus of the central film layer is greater than 6 GPa.

For example, in the transparent laminated film provided by at least an embodiment of the present disclosure, at least one of the group consisting of the transmittance of the first film layer and the transmittance of the second film layer is greater than 70%, and at least one of the group consisting of the elastic modulus of the first film layer and the elastic modulus of the second film layer is greater than 2.5 GPa.

For example, in the transparent laminated film provided by at least an embodiment of the present disclosure, an overall transmittance of the transparent laminated film is greater than 85%, and an overall elastic modulus of the transparent laminated film is greater than 5.5 GPa.

For example, in the transparent laminated film provided by at least an embodiment of the present disclosure, a thickness of the central film layer ranges from 50 µm to 80 µm, and at least one of the group consisting of a thickness of the first film layer and a thickness of the second film layer ranges from 5 µm to 10 µm.

For example, in the transparent laminated film provided by at least an embodiment of the present disclosure, a moisture absorption rate of the first film layer, a moisture absorption rate of the second film layer, and a moisture absorption rate of the central film layer are less than 1.0, and an overall moisture absorption rate of the transparent laminated film is less than 1.0.

For example, in the transparent laminated film provided by at least an embodiment of the present disclosure, a glass transition temperature of the central film layer is greater than 400° C., and at least one of the group consisting of a glass transition temperature of the first film layer and a glass transition temperature of the second film layer ranges from 220° C. to 260° C.

For example, in the transparent laminated film provided by at least an embodiment of the present disclosure, the first film layer, the central film layer, and the second film layer are directly stacked by hot pressing.

For example, the transparent laminated film provided by at least an embodiment of the present disclosure further includes a protective layer, the protective layer is stacked on a side, away from the central film layer, of the first film layer or the second film layer, and a hardness of the protective layer is greater than a hardness of the first film layer or a hardness of the second film layer.

For example, in the transparent laminated film provided by at least an embodiment of the present disclosure, a thickness of the protective layer ranges from 5 µm to 10 µm.

At least an embodiment of the present disclosure further provides a display device, including: a display panel, and the transparent laminated film provided by any one of the embodiments of the present disclosure; and the transparent laminated film covers a display side of the display panel.

For example, in the display device provided by at least an embodiment of the present disclosure, the display panel is a flexible organic light-emitting diode display panel.

For example, the display device provided by at least an embodiment of the present disclosure further includes a polarizer and a touch structure layer, and the polarizer and the touch structure layer are stacked between the display panel and the transparent laminated film.

For example, in the display device provided by at least an embodiment of the present disclosure, the transparent laminated film further includes a protective layer, the protective layer is stacked on a side, away from the display panel, of the transparent laminated film, and a hardness of the protective layer is greater than a hardness of the first film layer or a hardness of the second film layer.

At least an embodiment of the present disclosure further provides a method for manufacturing the transparent laminated film provided by any one of the embodiments of the present disclosure, including: stacking the first film layer and the second film layer on both sides of the central film layer by hot pressing, respectively.

For example, in the method for manufacturing the transparent laminated film provided by at least an embodiment of the present disclosure, the hot pressing includes hot pressing by a roller or hot pressing by a laminate.

For example, in the method for manufacturing the transparent laminated film provided by at least an embodiment of the present disclosure, a temperature of the hot pressing ranges from 300° C. to 350° C., a pressure of the hot pressing ranges from 0.8N to 1.0N, and a duration of the hot pressing ranges from 10 seconds to 30 seconds.

For example, the method for manufacturing the transparent laminated film provided by at least an embodiment of the present disclosure further includes: forming a protective layer on a side, away from the central film layer, of the first film layer or the second film layer; and a hardness of the protective layer is greater than a hardness of the first film layer or a hardness of the second film layer.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

FIG. 5 is a schematic flowchart of a method for manufacturing a transparent laminated film provided by some embodiments of the present disclosure;

FIG. 6 is a schematic diagram of a specific example of a hot pressing method of a transparent laminated film provided by some embodiments of the present disclosure;

FIG. 7 is a schematic diagram of a specific example of another hot pressing method of a transparent laminated film provided by some embodiments of the present disclosure;

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects.

As the uppermost surface of the display module, based on the high transmittance, high hardness, scratch resistance and other performances of glass, protective glass has been widely used in the window film. However, with respect to the development of flexible display and folding display technology, such high-thickness protective glass solutions are obviously incompetent. Currently, the development of window films for flexible display and folding display is mainly focused on the ultra-thin glass and high-performance transparent film material. Because of the performance requirements of flexible display and folding display for bending resistance, strong resilience and small creases, transparent thermosetting polyimide (PI) has become the mainstream material for window films of flexible display products.

However, in one aspect, because the thickness of the window film of the display device needs to be restricted, the rigidity and pressure resistance of the transparent thermosetting PI film material are affected; and in another aspect, when the thickness of the window film is increased, the transparent thermosetting PI film material is extremely prone to warping because of large internal stress, which may cause great difficulties in the preparation, bonding and use of the display device.

There are usually two solutions to alleviate the warping of single-layer transparent thermosetting PI film material. One solution is to provide hard coatings on both sides of the thermosetting PI film layer, and another solution is to use a double-layer thermosetting PI film structure.

Figure 1:
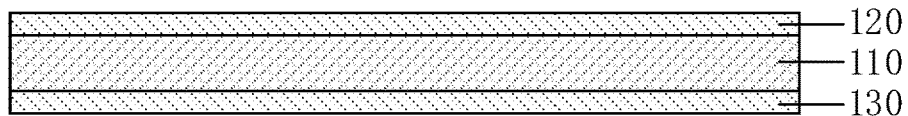
FIG. 1 is a structural schematic diagram of a single-layer transparent window film.

FIG. 1 is a structural schematic diagram of a single-layer transparent window film 100. As illustrated in FIG. 1, the transparent window film 100 includes a single-layer transparent thermosetting PI film layer 110 and hard coatings 120 and 130 disposed on both sides of the transparent thermosetting PI film layer 110. The hard coatings 120 and 130 allow the transparent window film 100 to have certain flatness and satisfy the performance requirements for scratch resistance, but simultaneously, the bending performance of the transparent window film 100 has been limited. In addition, the hard coatings 120 and 130 may further affect the pressure resistance of the transparent window film 100. Once the hard coating 120 or 130 is broken, it will generate crack visual phenomenon in the display area of the display device using the transparent window film 100, thereby providing negative influence on the display effect of the image. Moreover, processing the hard coatings 120 and 130 to both sides of the transparent thermosetting PI film layer 110 needs to provide great stress, which increases the difficulty of the preparation process and is not convenient for applying to large-scale practical production.

Figure 2:
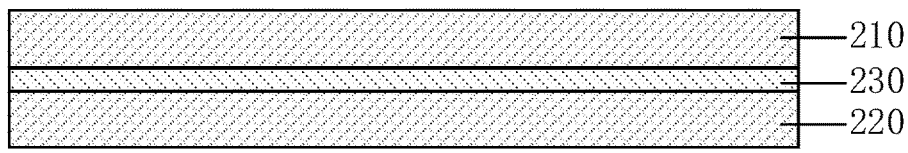
FIG. 2 is a structural schematic diagram of a double-layer transparent window film.

FIG. 2 is a structural schematic diagram of a double-layer transparent window film 200. As illustrated in FIG. 2, the transparent window film 200 includes two transparent thermosetting PI film layers 210 and 220, and a pressure-sensitive adhesive layer 230 is provided between the transparent thermosetting PI film layers 210 and 220 for bonding. The pressure-sensitive adhesive layer 230 usually uses optical adhesives. Although the structure of the double-layer transparent thermosetting PI film layer can allow the transparent window film 200 to satisfy good pressure resistance performance, the elastic modulus and resilience performance of the pressure-sensitive adhesive layer 230 cannot satisfy the bending requirements of folding display and are quite different from those of the transparent thermosetting PI film layer, so that the bending effect and the resilience performance of the transparent window film 200 are reduced. Moreover, the pressure-sensitive adhesive layer 230 has largely different elastic modulus from the transparent thermosetting PI film layers 210 and 220, and the film layers 210 and 220 are adhered to each other only by the pressure-sensitive adhesive layer 230, so that the adhesive structure is extremely vulnerable to time and the ambient conditions. Therefore, there is a risk of peeling between the transparent thermosetting PI film layers 210 and 220, and there will also cause a stress mismatch.

Based on the above problems, at least one embodiment of the present disclosure provides a transparent laminated film. The transparent laminated film uses a laminated design of a central thermosetting film layer, an upper thermoplastic film layer and a lower thermoplastic film layer, so as to form a window film material with a multi-layer structure used for a display device, thereby solving the problem of warping of the film material and improving flatness of the surface of the film material.

In the transparent laminated film provided by some embodiments of the present disclosure, on the basis of improving transmittance, the central thermosetting film layer, the upper thermoplastic film layer and the lower thermoplastic film layer may further ensure a certain flexibility, so that the transparent laminated film can achieve better bending effect and resilience performance.

In addition, in some embodiments of the present disclosure, the transparent laminated film can be prepared by a process method of hot-pressing lamination, so that the large stress required for preparing the single-layer transparent thermosetting PI film layer or an adhesive structure of the double-layer transparent thermosetting PI film can be obviated and the processing process of the film layer can be simplified, thereby greatly improving the success rate of preparation.

At least one embodiment of the present disclosure further provides a method for manufacturing the above transparent laminated film and a display device including the above transparent laminated film.

Hereinafter, some embodiments of the present disclosure will be described in detail with reference to the accompanying drawings. It should be noted that the same reference numerals used in different drawings refer to the same described components.

At least one embodiment of the present disclosure provides a transparent laminated film. The transparent laminated film includes a first film layer, a central film layer, and a second film layer which are sequentially stacked, each of a material of the first film layer and a material of the second film layer includes a thermoplastic plastic, and a material of the central film layer includes a thermosetting plastic.

Figure 3:
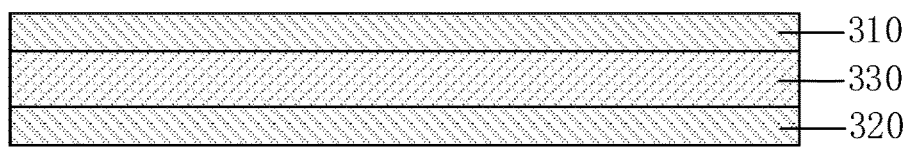
FIG. 3 is a schematic diagram of a layer structure of a transparent laminated film provided by some embodiments of the present disclosure.

FIG. 3 is a schematic diagram of a layer structure of a transparent laminated film 300 provided by some embodiments of the present disclosure. As illustrated in FIG. 3, the transparent laminated film 300 includes a first film layer 310, a central film layer 330, and a second film layer 320 which are sequentially stacked. The first film layer 310 and the second film layer 320 are thermoplastic plastics, and the central film layer 330 is a thermosetting plastic. The transparent laminated film 300 uses a laminated design of the central film layer 330, the first film layer 310 and the second film layer 320 to avoid or reduce warping of the plastic film material, thereby improving flatness of the surface of the transparent laminated film 300.

For example, the thermoplastic plastic used in the first film layer 310 and the second film layer 320 may include thermoplastic polyimide (TPI); and the thermosetting plastic used in the central film layer 330 may include thermosetting polyimide (PI), for example, including polyimide of bismaleimide (BMI) type, polyimide of in situ polymerization of monomer reactants (PMR) type, and modified products thereof. For example, both thermoplastic polyimide and thermosetting polyimide can use commercially available raw materials. Compared with thermosetting PI, thermoplastic PI is less brittle and has better bending performance. When the transparent laminated film 300 is bent, the expansion and contraction of the first film layer 310 and the second film layer 320 as external layers need to be larger than those of the central film layer 330, respectively. Therefore, the first film layer 310 and the second film layer 320 using the thermoplastic PI with better bending performance can allow the transparent laminated film 300 to satisfy the performance characteristics of being easily stretched and contracted and being elastically deformed, thereby allowing the transparent laminated film 300 to achieve better bending effect and resilience performance. Moreover, thermoplastic PI has a different glass transition temperature from thermosetting PI and further has good thermoplastic processing performance, so that the transparent laminated film 300 can be prepared by a method with the vacuum, high temperature and high pressure. Therefore, the bonding process of optical adhesive can be obviated, the bending effect and resilience performance of the transparent laminated film 300 can be ensured, and the process for processing the film layer can be simplified, thereby improving the success rate of preparation.

It should be noted that when the transparent laminated film 300 is bonded to the display panel, the bonding direction of the transparent laminated film 300 is not limited. The display component may be in contact with the first film layer 310 of the transparent laminated film 300, or may be in contact with the second film layer 320 of the transparent laminated film 300. The embodiments of the present disclosure are not limited in this aspect.

In some embodiments of the present disclosure, transmittances and elastic moduli of the first film layer 310, the second film layer 320, and the central film layer 330 may be different. The transmittance of each film layer may be determined, for example, by material characteristics, and for example, the transmittances of the first film layer 310 and the second film layer 320 can be changed by adjusting yellowing values of thermoplastic PI, thereby allowing an overall transmittance of the transparent laminated film 300 to satisfy requirements of image display. The bending effect and resilience performance of each film layer are related to the elastic modulus of the film layer, that is, in a case where each film layer has a certain flexibility, the smaller the elastic modulus of the film layer, the better the bending effect of the film layer, and the larger the elastic modulus of the film layer, the better the resilience performance of the film layer. Therefore, in some embodiments of the present disclosure, different elastic moduli are selected for each of the film layers to form a combination according to practical needs, and the film layers cooperate with each other, so as to allow the overall elastic modulus of the transparent laminated film 300 to satisfy the bending requirement and allow the entire transparent laminated film 300 to have a good bending effect and a good resilience performance.

For example, the transmittance of the central film layer 330 is greater than the transmittance of the first film layer 310 and greater than the transmittance of the second film layer 320, and the elastic modulus of the central film layer 330 is greater than the elastic modulus of the first film layer 310 and greater than the elastic modulus of the second film layer 320. In this way, the central film layer 330 with a high elastic modulus allows the transparent laminated film 300 to have a good bending resilience performance, and further the first film layer 310 and the second film layer 320 with small elastic moduli can provide a certain flexibility, thereby allowing the bending effect of the transparent laminated film 300 to satisfy requirements. For example, the thickness of the central film layer 330 is generally greater than the thickness of the first film layer 310 and the thickness of the second film layer 320, and therefore the high transmittance of the central film layer 330 can allow the transparent laminated film 300 to have a higher overall transmittance, thereby achieving high-quality image display effect.

For example, in one example, the transmittance of the central film layer 330 is greater than 90%, and the elastic modulus of the central film layer 330 is greater than 6 GPa. For example, the transmittance of the first film layer 310 and/or the transmittance of the second film layer 320 is greater than 70%, and the elastic modulus of the first film layer 310 and/or the elastic modulus of the second film layer 320 is greater than 2.5 GPa. For example, the overall elastic modulus of the transparent laminated film 300 is greater than 5.5 GPa, and the overall transmittance of the transparent laminated film 300 is greater than 85%. For example, the overall transmittance of the transparent laminated film 300 may be further greater than 90%, thereby allowing the display panel to which the transparent laminated film 300 is attached to achieve better image display effect.

It should be noted that the elastic modulus of the first film layer 310 and the elastic modulus of the second film layer 320 may be the same or different, and the transmittance of the first film layer 310 and the transmittance of the second film layer 320 may be the same or different. For example, in a case where the first film layer 310 and the second film layer 320 have the same elastic modulus, both sides of the central film layer 330 are subjected to the same stress, so that the warping degree of the transparent laminated film 300 can be better alleviated, and the flatness of the surface of the transparent laminated film 300 can be further ensured. For example, when the transparent laminated film 300 is attached to the display component, the elastic modulus of one, away from the display component, of the first film layer 310 and the second film layer 320 may be smaller than the elastic modulus of the other of the first film layer 310 and the second film layer 320.

For example, the thickness of the central film layer 330 ranges from 50 μm to 80 μm, and the thickness of the first film layer 310 and/or the thickness of the second film layer 320 ranges from 5 μm to 10 μm, so that the overall thickness of the transparent laminated film 300 may range from 60 μm to 100 μm. The thickness of the double-layer transparent window film 200 illustrated in FIG. 2 usually ranges from 160 μm to 200 μm. Therefore, compared with the double-layer transparent window film 200, the transparent laminated film 300 provided by some embodiments of the present disclosure is thinner and lighter, and can simultaneously achieve a higher overall transmittance. For example, the thicknesses of the first film layer 310 and the thickness of the second film layer 320 may be the same or different, which may be determined based on factors such as an interface contacting the first film layer 310 and an interface contacting the second film layer 320, the locations in the laminated structure, etc.

For example, a moisture absorption rate of the first film layer 310, a moisture absorption rate of the second film layer 320, and a moisture absorption rate of the central film layer 330 are all less than 1.0, and for example, may range from 0.5 to 0.9, and an overall moisture absorption rate of the transparent laminated film 300 is less than 1.0, so that various performances, such as scratch resistance, pressure resistance, easily being stretched and contracted, etc., of the transparent laminated layer 300 can be improved.

For example, a glass transition temperature of the central film layer 330 is greater than 400° C., and a glass transition temperature of the first film layer 310 and/or a glass transition temperature of the second film layer 320 ranges from 220° C. to 260° C., so that the first film layer 310, the central film layer 330 and the second film layer 320 can be prepared by hot pressing. Therefore, the large stress required for preparing the single-layer transparent window film 100 illustrated in FIG. 1 or the adhesive structure of the double-layer transparent window film 200 illustrated in FIG. 2 can be obviated, and the processing process of the film layers can be simplified, thereby greatly improving the success rate of preparation.

For example, the transparent laminated film 300 including the first film layer 310, the central film layer 330, and the second film layer 320 may be formed by directly stacking and hot pressing the raw material layers of the above first film layer 310, the central film layer 330, and the second film layer 320, and details will be described in the following.

Figure 4:
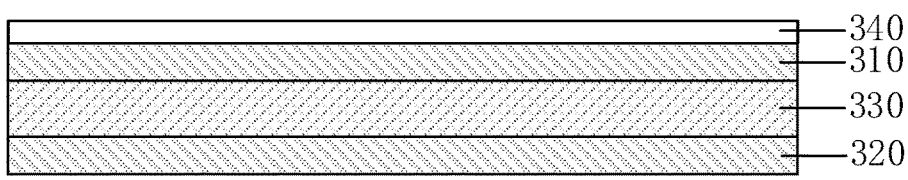
FIG. 4 is a schematic diagram of a layer structure of another transparent laminated film provided by some embodiments of the present disclosure.

FIG. 4 is a schematic diagram of a layer structure of another transparent laminated film 400 provided by some embodiments of the present disclosure. As illustrated in FIG. 4, the transparent laminated film 400, except for including a protective layer 340, of this embodiment is substantially the same as or similar to the transparent laminated film 300 illustrated in FIG. 3. In this embodiment, the protective layer 340 is stacked on a side, away from the central film layer 330, of the first film layer 310, and the hardness of the protective layer 340 is greater than the hardness of the first film layer 310 or the hardness of the second film layer 320. The protective layer 340 may be an inorganic coating, for example, alumina, silicon oxide, diamond-like carbon (DLC), or other suitable materials may be used, and for example, methods such as chemical vapor deposition, physical vapor deposition (e.g., sputtering), plasma spraying, or the like may be used to prepare the protective layer 340. The protective layer 340 can allow flatness and scratch resistance of the transparent laminated film 400 to be further improved, thereby providing better protection for the display device including the transparent laminated film 400.

For example, the thickness of the protective layer 340 may range from 5 μm to 10 μm, thereby allowing the overall thickness of the transparent laminated film 400 to be small and avoiding the overall transmittance of the transparent laminated film 400 from being affected.

It should be noted that, in the embodiments illustrated in FIG. 4, the protective layer 340 is stacked on the side, away from the central film layer 330, of the first film layer 310, and in other embodiments of the present disclosure, the protective layer 340 may also be stacked on the side, away from the central film layer 330, of the second film layer 320. When the transparent laminated film 400 is attached to the display panel, the protective layer 340 is stacked on a side, away from the display panel, of the transparent laminated film 400.

At least one embodiment of the present disclosure further provides a method for manufacturing the transparent laminated film provided by any one of the embodiments of the present disclosure, and the method includes: stacking the first film layer and the second film layer on both sides of the central film layer by hot pressing, respectively. By using this manufacturing method, the large stress required for preparing the single-layer transparent thermosetting PI film layer or the adhesive structure of the double-layer transparent thermosetting PI film can be obviated, and the processing process of the film layers can be simplified, thereby greatly improving the success rate of preparation.

FIG. 5 is a schematic flowchart of a method for manufacturing a transparent laminated film provided by some embodiments of the present disclosure. The method for manufacturing the transparent laminated film can be used to manufacture the transparent laminated film 300 or the transparent laminated film 400 provided by any one of the embodiments of the present disclosure.

For example, as illustrated in FIG. 5, in some embodiments, the method for manufacturing the transparent laminated film 300 includes a step S10: stacking the first film layer 310 and the second film layer 320 on both sides of the central film layer 330 by hot pressing, respectively.

For example, as illustrated in FIG. 5, in some embodiments, the method for manufacturing the transparent laminated film 400 further includes a step S20: forming a protective layer 340 on a side, away from the central film layer 330, of the first film layer 310 (or the second film layer 320) by plating.

For example, in the step S10, the hot pressing includes hot pressing by a roller or hot pressing by a laminate.

FIG. 6 is a schematic diagram of a specific example of a hot pressing method of the transparent laminated film 300 provided by some embodiments of the present disclosure. As illustrated in FIG. 6, the first film layer 310 and the second film layer 320 may be stacked on both sides of the central film layer 330 by hot pressing through a first laminate 410 and a second laminate 420, respectively. In the hot pressing process, for example, a unidirectional pressing method or a bidirectional pressing method can be used; in the unidirectional pressing method, for example, the second laminate 420 is disposed on a stationary base, and in the situation illustrated in FIG. 6, the pressure is applied to the first laminate 410 from top to bottom; and in the bidirectional pressing method, in the situation illustrated in FIG. 6, the first pressure is applied to the first laminate 410 from top to bottom, and the second pressure is applied to the second laminate 420 from bottom to top. In some embodiments, the first film layer 310 and the second film layer 320 are made of thermoplastic polyimide, and the central film layer 330 is made of thermosetting polyimide. In the above manners, for example, the first laminate 410 and the second laminate 420 are not only used for applying pressure, but also may have a heating function (such as heating by a resistance or heating by a hot gas or hot oil); alternatively, a heating device may be provided separately. For example, in some embodiments, when the first film layer 310 with a thickness ranging from 5 μm to 10 μm and the second film layer 320 with a thickness ranging from 5 μm to 10 μm are processed by hot pressing, the temperature of the hot pressing ranges from 300° C. to 350° C., the pressure of the hot pressing ranges from 0.8N to 1.0N, and the duration of the hot pressing ranges from 10 seconds to 30 seconds. For example, the glass transition temperature of the central film layer 330 of thermosetting PI is greater than 400° C., and the glass transition temperature of the first film layer 310 and/or the glass transition temperature of the second film layer 320 of thermoplastic PI ranges from 220° C. to 260° C. Therefore, the hot-pressing lamination temperature of 300° C. to 350° C. selected in the hot pressing method is between the above glass transition temperatures, thereby ensuring the implementation of the hot-pressing process and allowing the method for manufacturing the transparent laminated film 300 provided by the embodiments of the present disclosure to be applied in practical production.

FIG. 7 is a schematic diagram of a specific example of another hot pressing method of the transparent laminated film 300 provided by some embodiments of the present disclosure. As illustrated in FIG. 7, the first film layer 310 and the second film layer 320 may be stacked on both sides of the central film layer 330 by hot pressing through a first pressing roller 510 and a second pressing roller 520, respectively; and during the hot pressing process, the unidirectional pressing method or the bidirectional pressing method can also be used. In some embodiments, the first film layer 310 and the second film layer 320 are made of thermoplastic polyimide, and the central film layer 330 is made of thermosetting polyimide. In the above manners, for example, the first pressing roller 510 and the second pressing roller 520 are not only used for applying pressure, but may also have a heating function (such as heating by a resistance or heating by a hot gas or hot oil); alternatively, a heating device may be provided separately. For example, in some embodiments, when the first film layer 310 with a thickness ranging from 5 μm to 10 μm and the second film layer 320 with a thickness ranging from 5 μm to 10 μm are processed by hot pressing, the temperature of the hot pressing may also range from 300° C. to 350° C., the pressure of the hot pressing may also range from 0.8N to 1.0N, and the duration of the hot pressing may also range from 10 seconds to 30 seconds.

At least one embodiment of the present disclosure further provides a display device, the display device includes a display panel and the transparent laminated film provided by any one of the embodiments of the present disclosure, for example, the transparent laminated layer 300 of the embodiments illustrated in FIG. 3 or the transparent laminated layer 400 of the embodiments illustrated in FIG. 4, and the transparent laminated film covers a display side of the display panel. Because the problem of warping existing in the film material is avoided, the transparent laminated film in the display device can improve flatness of the surface of the display device. In some embodiments of the present disclosure, the transparent laminated film in the display device can further allow the display device to satisfy the performance requirements of pressure resistance and scratch resistance; and in some embodiments of the present disclosure, the transparent laminated film in the display device can further allow the display device to implement a good bending effect and resilience performance.

Figure 8A:
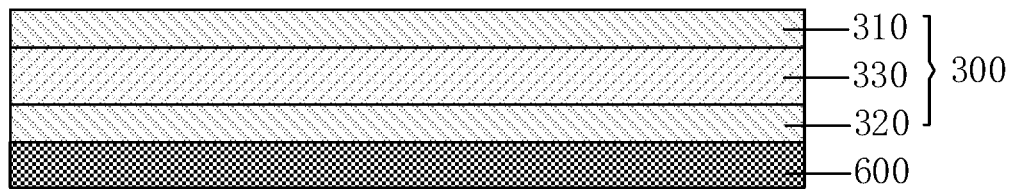
FIG. 8A and FIG. 8B are structural schematic diagrams of a display device provided by some embodiments of the present disclosure.
Figure 8B:
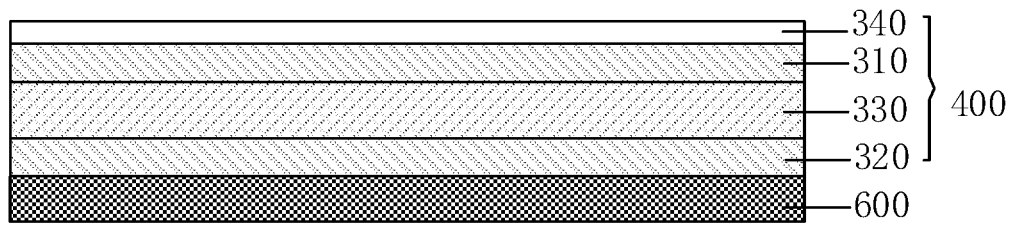

FIG. 8A and FIG. 8B are structural schematic diagrams of a display device 10 provided by some embodiments of the present disclosure. As illustrated in FIG. 8A, the display device 10 includes a display panel 600 and the transparent laminated film 300 illustrated in FIG. 3 covering a display side of the display panel 600; alternatively, as illustrated in FIG. 8B, the display device 10 includes the display panel 600 and the transparent laminated film 400 illustrated in FIG. 4 covering the display side of the display panel 600.

For example, as illustrated in FIG. 8A, when the transparent laminated film 300 is attached to the display panel 600, the display panel 600 may be in contact with the second film layer 320 of the transparent laminated film 300. In other embodiments of the present disclosure, the display panel 600 may also be in contact with the first film layer 310 of the transparent laminated film 300, and the embodiments of the present disclosure are not limited in this aspect.

For example, as illustrated in FIG. 8B, when the transparent laminated film 400 is attached to the display panel 600, the protective layer 340 is on the side, away from the display panel 600, of the transparent laminated film 400, and the display panel 600 is in contact with the second film layer 320 of the transparent laminated film 400. In some other embodiments of the present disclosure, in a case where the protective layer 340 is stacked on the side, away from the central film layer 330, of the second film layer 320, the display panel 600 is in contact with the first film layer 310 of the transparent laminated film 400.

For example, in the embodiments illustrated in FIG. 8A and FIG. 8B, the display panel 600 may be a flexible organic light-emitting diode (OLED) display panel, a quantum dot light-emitting diode (QLED) display panel, a liquid crystal display panel, an electronic paper display panel, etc.

It should be noted that, in some embodiments of the present disclosure, the display device 10 may further include more components and structures. These components and structures should be understood by those skilled in the art and are not described herein, and it should not be taken as a limitation of the embodiments of the present disclosure.

For example, the display device provided by some embodiments of the present disclosure may further include a polarizer, a touch structure layer, etc. In the following, the transparent laminated film 300 illustrated in FIG. 3 is taken as an example for description.

Figure 9:
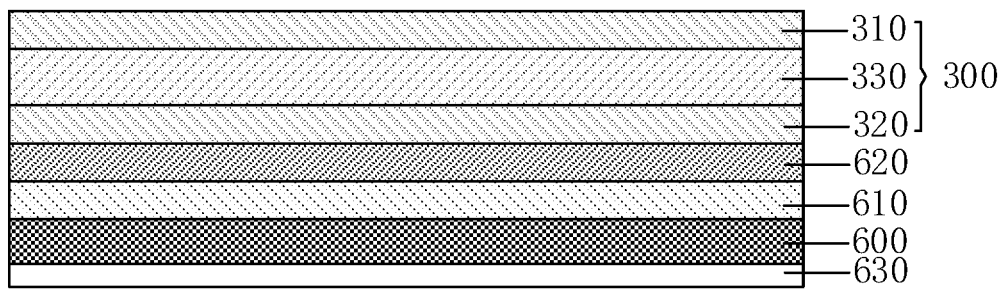
FIG. 9 is a structural schematic diagram of another display device provided by some embodiments of the present disclosure.

FIG. 9 is a structural schematic diagram of another display device 20 provided by some embodiments of the present disclosure. As illustrated in FIG. 9, in addition to including the display panel 600 and the transparent laminated film 300, the display device 20 may further include a polarizer 610 and a touch structure layer 620, and the polarizer 610 and the touch structure layer 620 are stacked between the display panel 600 and the transparent laminated film 300. The polarizer 610 is disposed between the display panel 600 and the touch structure layer 620, the touch structure layer 620 is disposed between the polarizer 610 and the transparent laminated film 300, and the plurality of components such as the display panel 600, the polarizer 610, the touch structure layer 620 and the transparent laminated film 300 can be bonded together as a whole by, for example, optical adhesives.

For example, the polarizer 610 is a circular polarizer, and the circular polarizer includes a linear polarizing layer and a quarter-wave plate that are stacked. The linear polarizing layer is located on the display side of the display panel 600, and the axis of the quarter-wave plate and the polarization axis of the linear polarizing layer form a 45-degree angle. Therefore, when external light passes through the circular polarizer, the external light is converted into circular polarized light. After the circular polarized light is reflected back by the electrodes in the display panel 600, the circular polarized light passes through the quarter-wave plate a second time and is converted into linearly polarized light. But the polarization direction of the linearly polarized light is different from the polarization axis of the linear polarizing layer by 90 degrees, and the linearly polarized light cannot pass through the linear polarizing layer. Therefore, the polarizer 610 can absorb external light illuminated to the display device 20, thereby reducing the interference of external ambient light and improving the contrast of the display image of the display device 20.

For example, the type of the touch structure layer 620 may include a resistance type, a capacitance type, an infrared-ray type, an acoustic-wave type, or other types. For example, the touch unit of the capacitance type may include a self-capacitance type and a mutual capacitance type, for example, including a plurality of touch units. When an external object (such as a finger) approaches, the capacitance value of the touch unit of the capacitance type changes, so that the touched position of the display device 20 can be detected. The embodiments of the present disclosure do not limit the type and specific structure of the touch structure layer 620, and for example, the display panel 600 itself may have a built-in touch structure (i.e., an in-cell touch structure).

For example, the display device 20 may further include a base substrate 630, and the base substrate 630 is disposed on a side, away from the transparent laminated film 300, of the display panel 600. The base substrate 630 may be a glass substrate, a plastic substrate, or other flexible substrates.

For example, the display device 10 and the display device 20 may be any product or component having a display function, such as a liquid crystal panel, an electronic paper, an OLED panel, a mobile phone, a tablet computer, a television, a display screen, a notebook computer, a digital photo frame, a navigator, or the like, and the embodiments of the present disclosure are not limited in this aspect.

The following statements should be noted:

(1) The accompanying drawings involve only the structure(s) in connection with the embodiment(s) of the present disclosure, and other structure(s) can be referred to common design(s).

(2) For clarity, in accompanying drawings for illustrating the embodiment(s) of the present disclosure, the thickness of a layer or a structure may be enlarged or reduced, that is, these accompanying drawings are not drawn according to actual scales. It should be understood that, in a case where a component or element such as a layer, film, area, substrate or the like is referred to be "on" or "under" another component or element, it may be directly on or under the another component or element or a component or element is interposed therebetween.

(3) In case of no conflict, features in one embodiment or in different embodiments can be combined to obtain new embodiments.

What have been described above are only specific implementations of the present disclosure, the protection scope of the present disclosure is not limited thereto. Any modifications or substitutions within the technical scope of the present disclosure easily obtained by those skilled in the art should be within the protection scope of the present disclosure, and therefore the protection scope of the present disclosure should be based on the protection scope of the claims.

What is claimed is:

1. A transparent laminated film, used for covering a display side of a display panel, comprising a first film layer, a central film layer, and a second film layer which are sequentially stacked,
   wherein each of a material of the first film layer and a material of the second film layer comprises a thermoplastic plastic, and a material of the central film layer comprises a thermosetting plastic,
   wherein a transmittance of the central film layer is greater than 90%, and an elastic modulus of the central film layer is greater than 6 Gpa, wherein the transmittance of the central film layer is greater than a transmittance of the first film layer and greater than a transmittance of the second film layer.

2. The transparent laminated film according to claim 1, wherein the thermoplastic plastic comprises thermoplastic polyimide, and the thermosetting plastic comprises thermosetting polyimide.

3. The transparent laminated film according to claim 1, wherein the elastic modulus of the central film layer is greater than an elastic modulus of the first film layer and greater than an elastic modulus of the second film layer.

4. The transparent laminated film according to claim 1, wherein at least one of the group consisting of a transmittance of the first film layer and a transmittance of the second film layer is greater than 70%, and
at least one of the group consisting of the elastic modulus of the first film layer and the elastic modulus of the second film layer is greater than 2.5 GPa.

5. The transparent laminated film according to claim 1, wherein an overall transmittance of the transparent laminated film is greater than 85%, and an overall elastic modulus of the transparent laminated film is greater than 5.5 GPa.

6. The transparent laminated film according to claim 1, wherein a thickness of the central film layer ranges from 50 μm to 80 μm, and at least one of the group consisting of a thickness of the first film layer and a thickness of the second film layer ranges from 5 μm to 10 μm.

7. The transparent laminated film according to claim 1, wherein a glass transition temperature of the central film layer is greater than 400° C., and at least one of the group consisting of a glass transition temperature of the first film layer and a glass transition temperature of the second film layer ranges from 220° C. to 260° C.

8. The transparent laminated film according to claim 1, further comprising a protective layer,
wherein the protective layer is stacked on a side, away from the central film layer, of the first film layer or the second film layer, and
a hardness of the protective layer is greater than a hardness of the first film layer or a hardness of the second film layer.

9. The transparent laminated film according to claim 8, wherein a thickness of the protective layer ranges from 5 μm to 10 μm.

10. A display device, comprising:
a display panel, and
the transparent laminated film according to claim 1, wherein the transparent laminated film covers a display side of the display panel.

11. The display device according to claim 10, wherein the display panel is a flexible organic light-emitting diode display panel.

12. The display device according to claim 10, further comprising a polarizer and a touch structure layer,
wherein the polarizer and the touch structure layer are stacked between the display panel and the transparent laminated film.

13. The display device according to claim 10, wherein the transparent laminated film further comprises a protective layer,
the protective layer is stacked on a side, away from the display panel, of the transparent laminated film, and a hardness of the protective layer is greater than a hardness of the first film layer or a hardness of the second film layer.

14. A method for manufacturing the transparent laminated film according to claim 1, comprising:
stacking the first film layer and the second film layer on both sides of the central film layer by hot pressing, respectively.

15. The method for manufacturing the transparent laminated film according to claim 14, wherein the hot pressing comprises hot pressing by a roller or hot pressing by a laminate.

16. The method for manufacturing the transparent laminated film according to claim 14, wherein a temperature of the hot pressing ranges from 300° C. to 350° C., a pressure of the hot pressing ranges from 0.8N to 1.0N, and a duration of the hot pressing ranges from 10 seconds to 30 seconds.

17. A transparent laminated film, used for covering a display side of a display panel, comprising a first film layer, a central film layer, and a second film layer which are sequentially stacked,
wherein each of a material of the first film layer and a material of the second film layer comprises a thermoplastic plastic, and a material of the central film layer comprises a thermosetting plastic,
wherein at least one of the group consisting of a transmittance of the first film layer and a transmittance of the second film layer is greater than 70%, and
at least one of the group consisting of an elastic modulus of the first film layer and an elastic modulus of the second film layer is greater than 2.5 Gpa,
wherein the transmittance of the central film layer is greater than a transmittance of the first film layer and greater than a transmittance of the second film layer.

* * * * *